Figure 9:
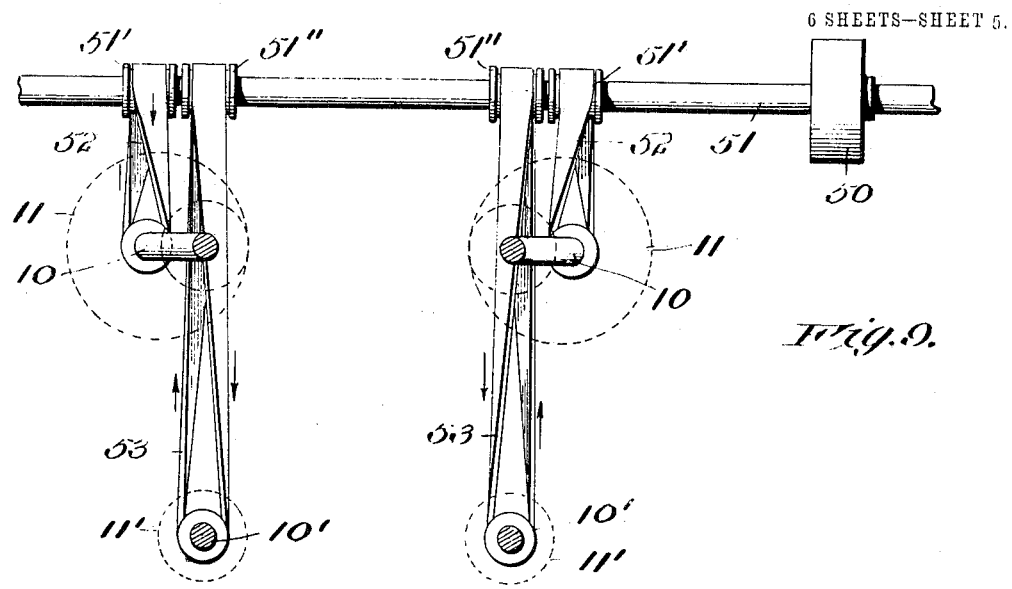

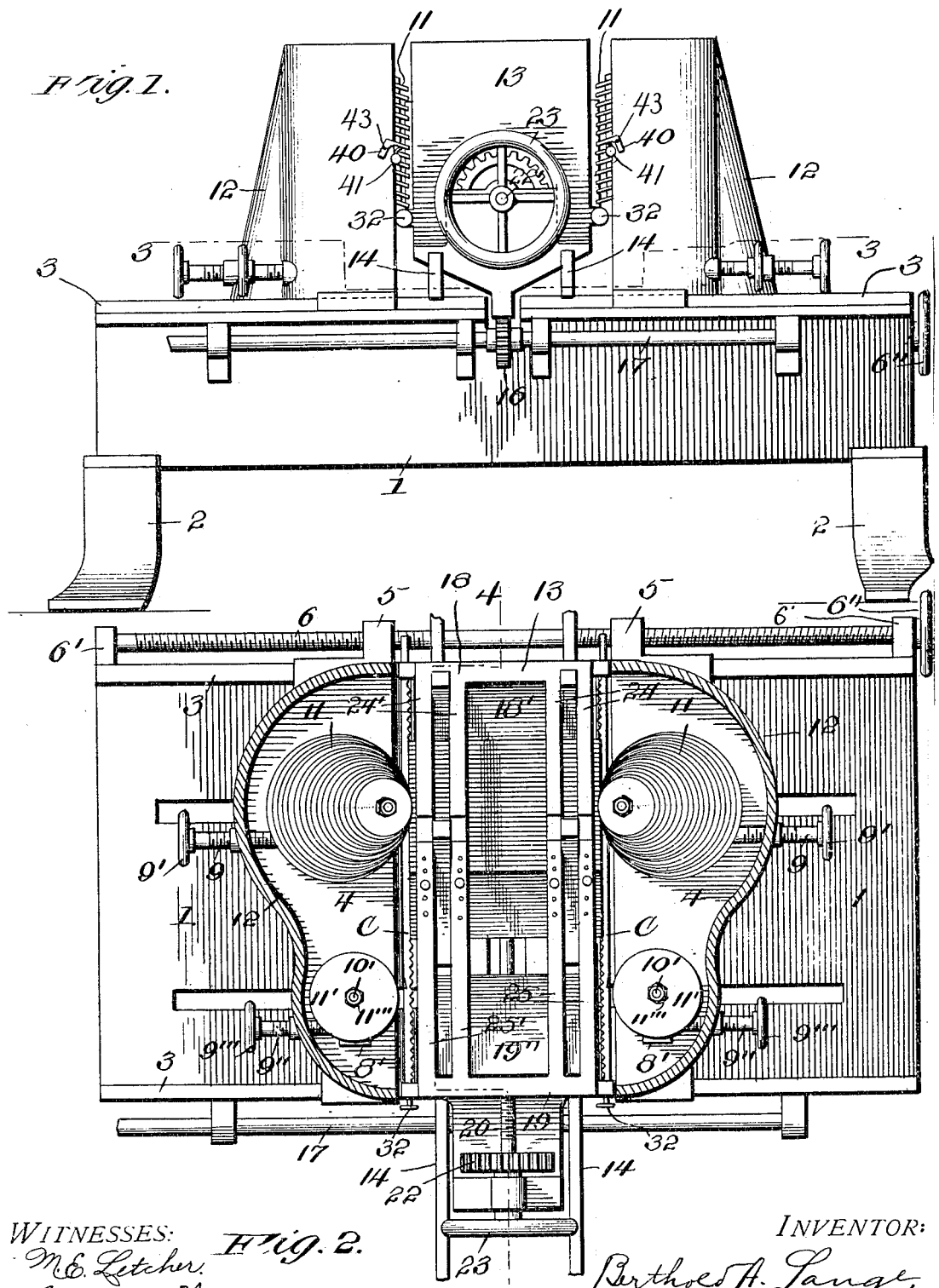

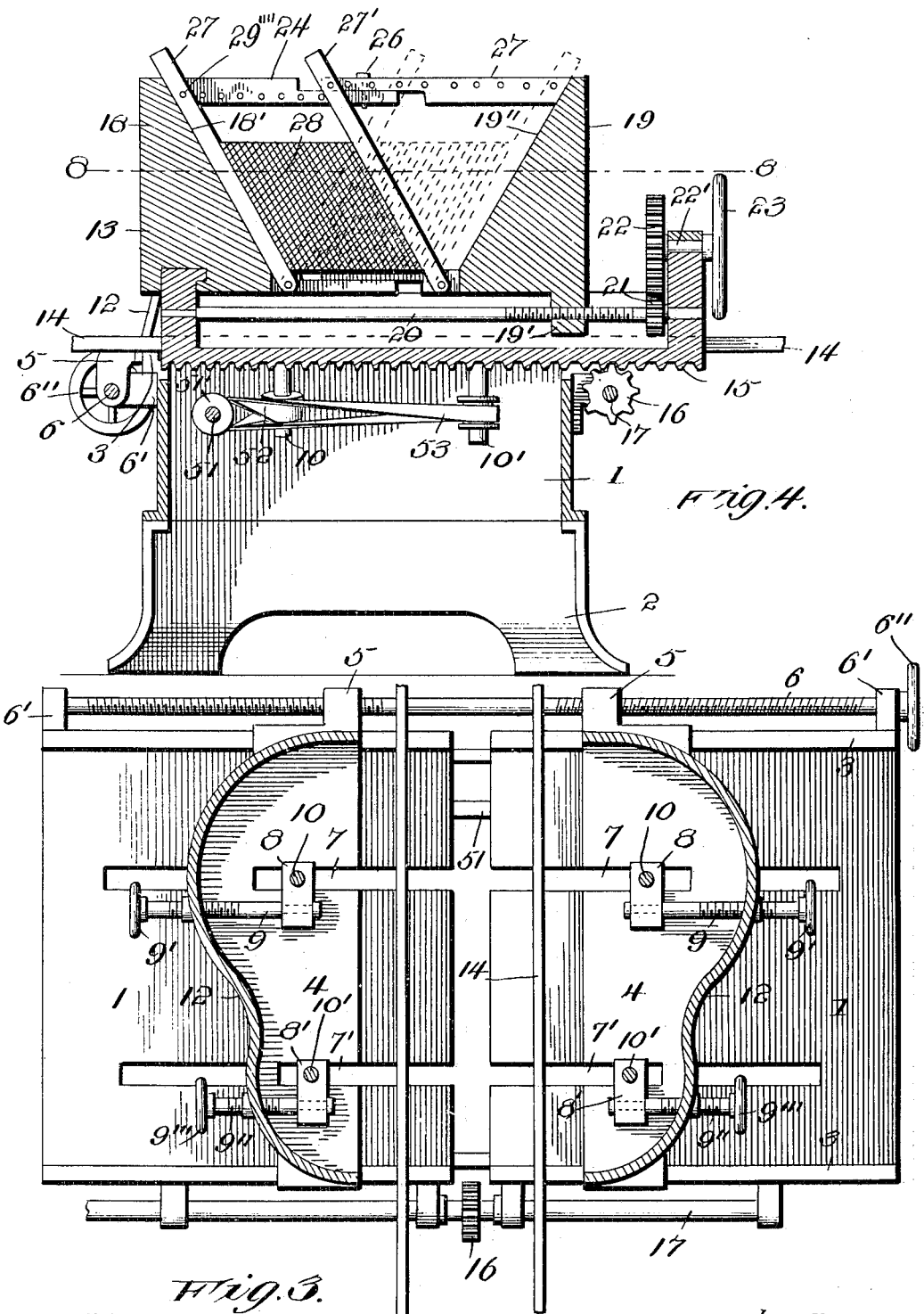

No. 819,033. PATENTED APR. 24, 1906.
B. A. LANGE.
WOODWORKING MACHINE.
APPLICATION FILED JAN. 28, 1905.
6 SHEETS—SHEET 3.
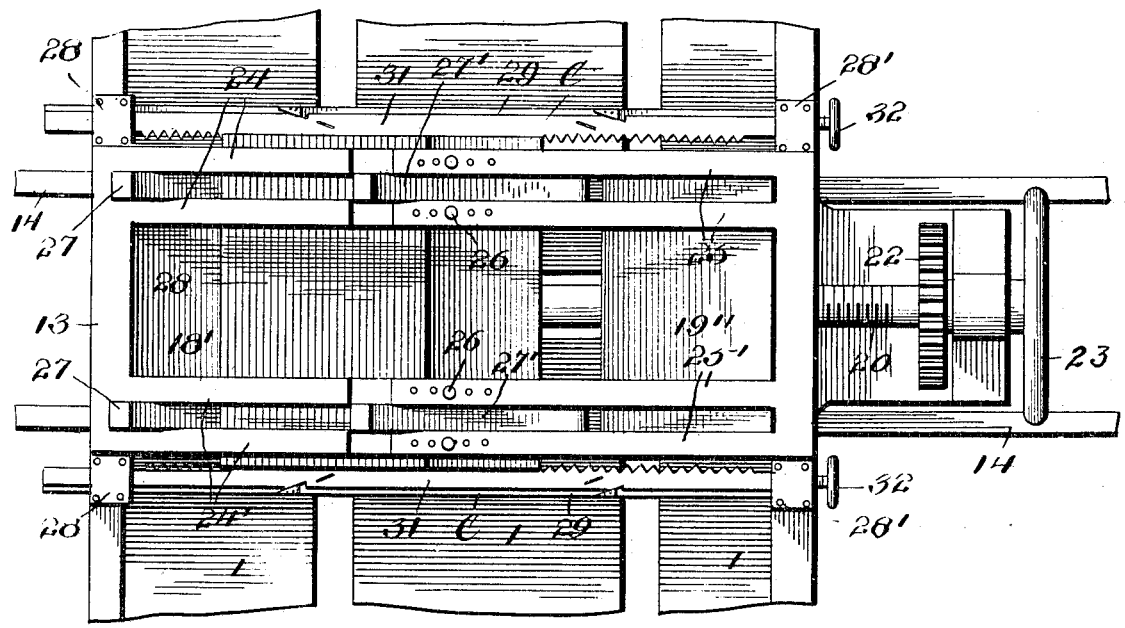
Fig.5.
Fig.7.
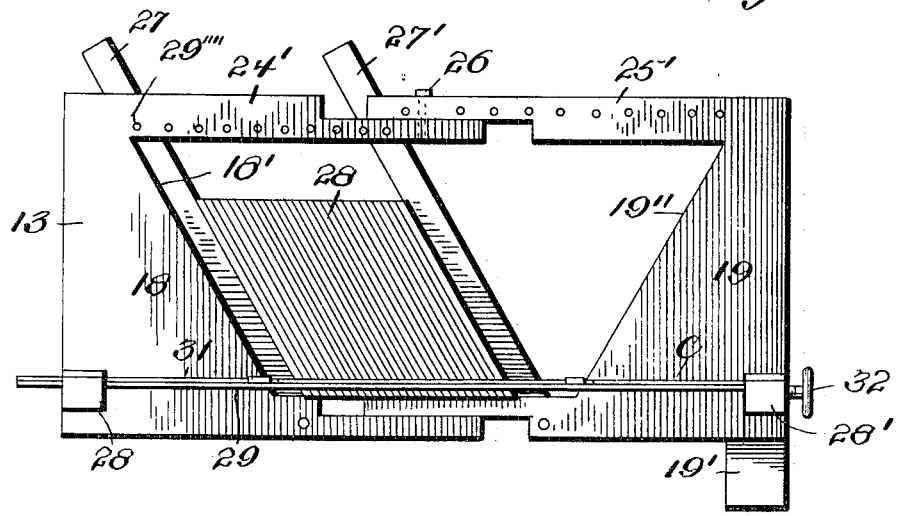
WITNESSES:
M. E. Letcher.
Gladys Waltow.
INVENTOR:
Berthold A. Lange,
By Hugh K. Wagner
His Attorney.

No. 819,033.  
PATENTED APR. 24, 1906.
B. A. LANGE.  
WOODWORKING MACHINE.  
APPLICATION FILED JAN. 28, 1905.
6 SHEETS—SHEET 4.
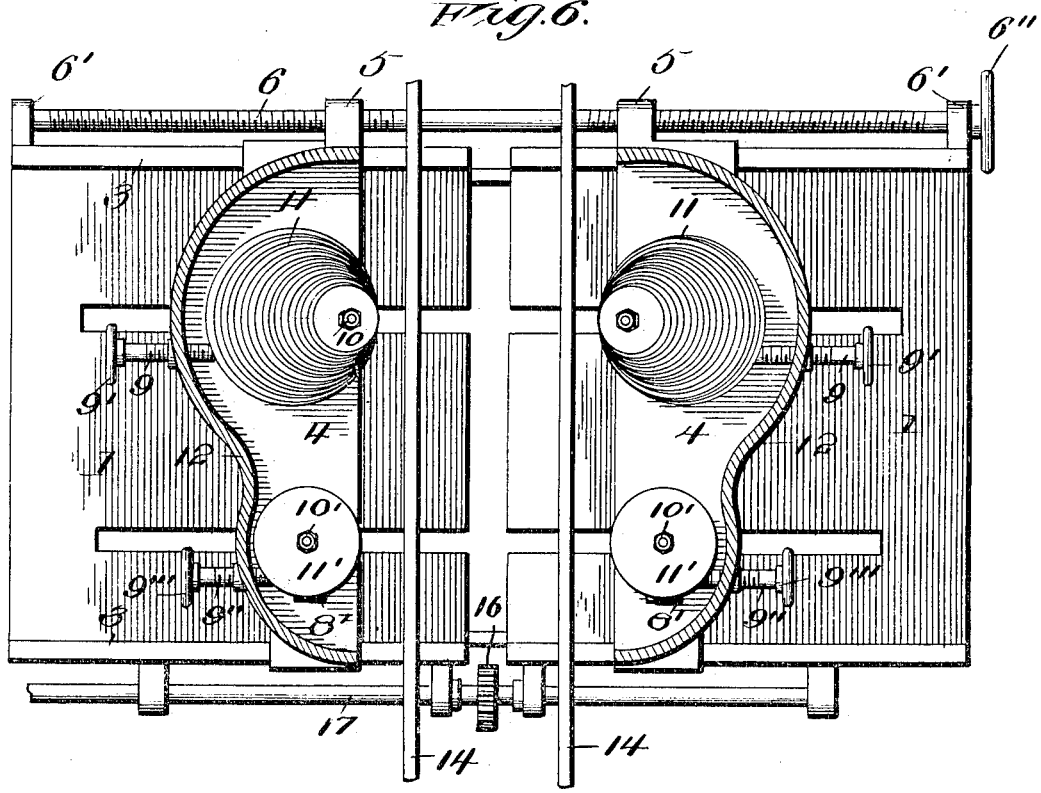
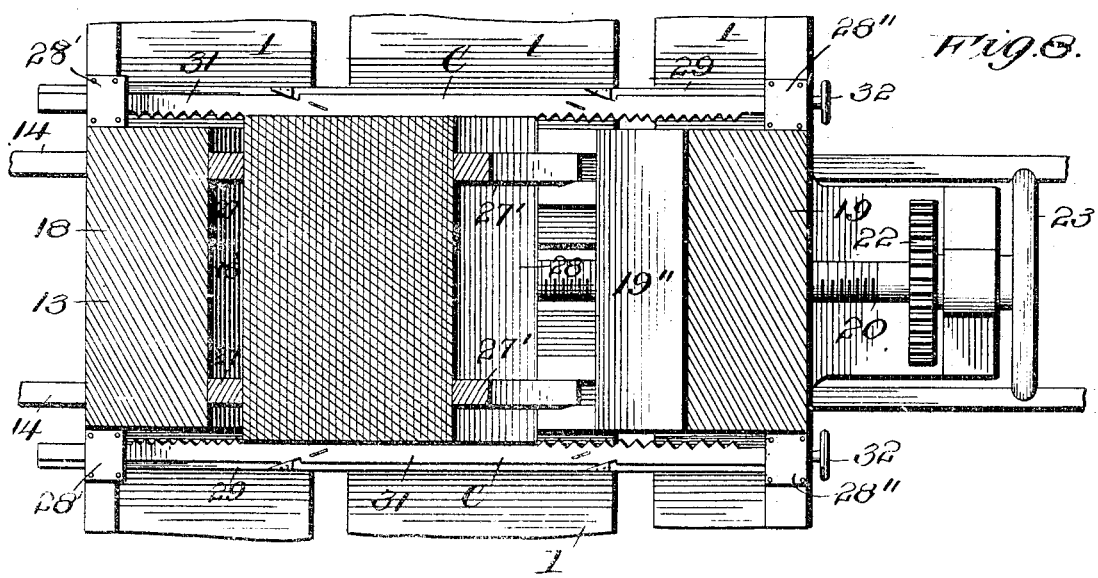
WITNESSES:  
M. E. Letcher.  
Gladys Walton.
INVENTOR:  
Berthold A. Lange,  
By Hugh K. Wagner,  
His Attorney.

No. 819,033. PATENTED APR. 24, 1906.
B. A. LANGE.
WOODWORKING MACHINE.
APPLICATION FILED JAN. 28, 1905.

6 SHEETS—SHEET 5.

WITNESSES:
M. E. Letcher
Gladys Walton

INVENTOR:
Berthold A. Lange,
BY
Hugh K. Wagner,
His Attorney.

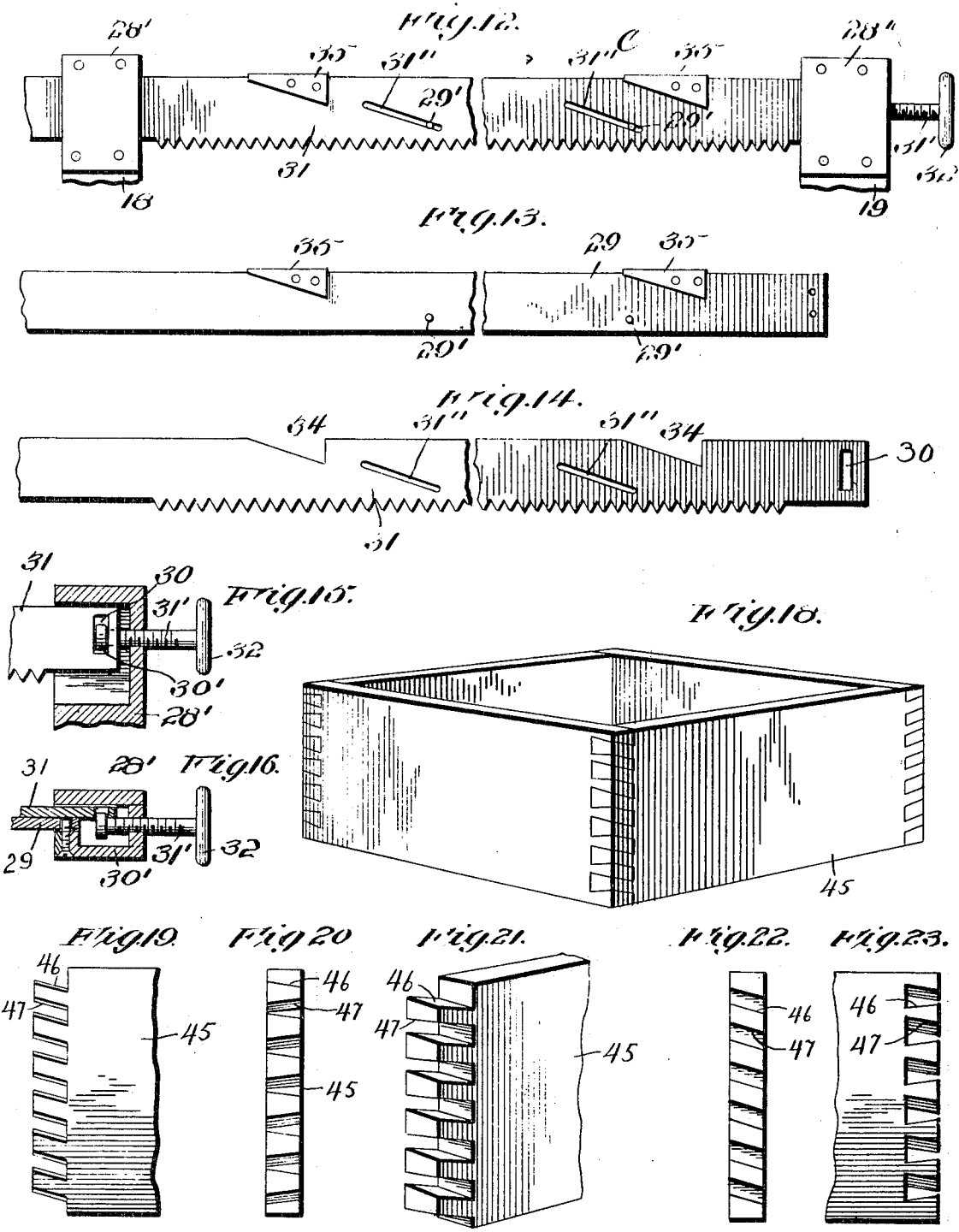

UNITED STATES PATENT OFFICE.

BERTHOLD A. LANGE, OF ST. LOUIS, MISSOURI.

WOODWORKING-MACHINE.

No. 819,033.      Specification of Letters Patent.      Patented April 24, 1906.

Continuation of application Serial No. 116,616, filed July 23, 1902. This application filed January 28, 1905. Serial No. 243,157.

*To all whom it may concern:*

Be it known that I, BERTHOLD A. LANGE, a citizen of the United States, residing at the city of St. Louis, State of Missouri, have invented certain new and useful Improvements in Woodworking-Machines, of which the following is a specification.

This invention has relation to wood-sawing machines, being a continuation of an application filed July 23, 1902, Serial No. 116,616, and relates in particular to machines for forming mortises and tenons on the ends of boards which are to be used as sections of boxes.

In the machine which forms the subject-matter of this invention a shook or load—that is, a plurality of boards of equal length—is operated upon at both ends simultaneously; and one of the objects of the present invention is to provide novel means for adjusting the saws which simultaneously operate upon the two ends of the shook so as to increase or diminish the distance therebetween to accommodate shooks of varying length and to provide means for adjusting the saws independently of the first-mentioned adjustment to throw one or more sets of saws into or out of operative position to make mortises and tenons of different designs.

A further object of this invention is to provide the work-holder of the machine with novel means for shifting the shook, so as to permit the saws to act thereon at different angles, whereby mortises and tenons of different forms may be made in the edges of the box-sections.

A still further object is to provide novel means for preventing the shook from becoming disarranged when the saws begin to operate thereon.

A still further object is to provide novel means for preventing the shook from becoming disarranged while it is being shifted.

Having the above and other objects in view the invention consists in the novel constructions, combinations, and arrangements of parts hereinafter described and claimed, and illustrated in the accompanying drawings, in which—

Figure 10:
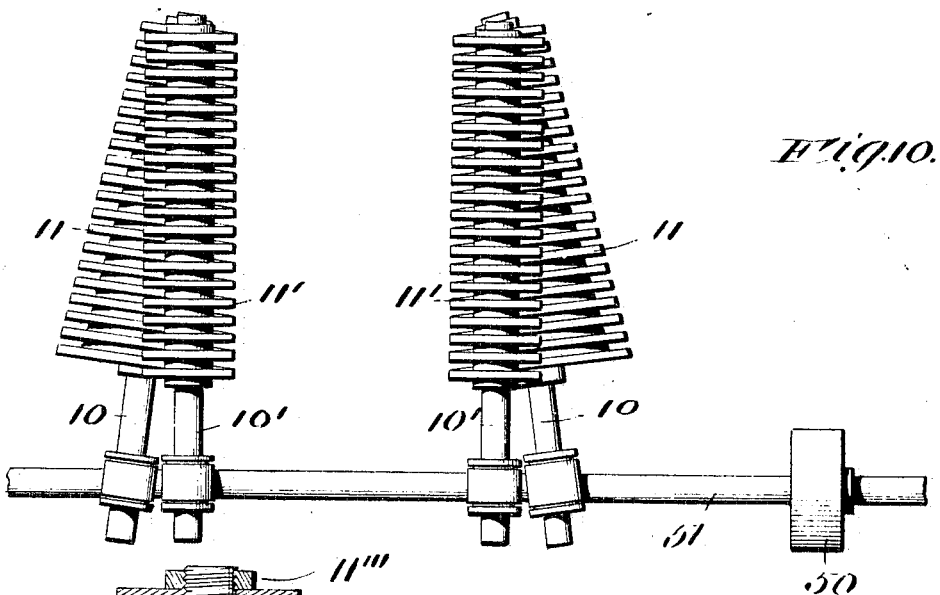
Figure 11:
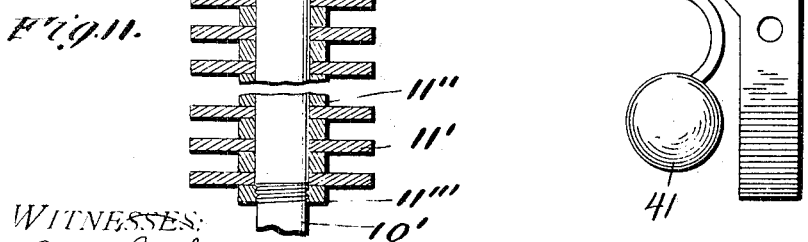
Figure 17:
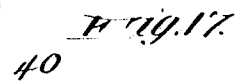

Figure 1 is a front elevation. Fig. 2 is a top plan view showing the relation of the oblique and vertical saw-shafts and work-holder, with the shields which partly surround the saws in section. Fig. 3 is a horizontal sectional view on the line 3 3 of Fig. 1. Fig. 4 is a vertical sectional view on the line 4 4 of Fig. 2. Fig. 5 is a top view of a portion of the machine, showing the shook or load of boards to be cut and the cradle carrying the same. Fig. 6 is a view similar to Fig. 2, but with the work-holding cradle removed. Fig. 7 is a detail side elevation of the work-holder. Fig. 8 is a horizontal sectional view of that portion of the machine shown in Fig. 4 on the line 8 8 of said Fig. 4. Fig. 9 is a top plan view of mechanism for the transmission of power to the saw-shafts. Fig. 10 is a view showing the relative positions of the oblique and vertical saw-shafts. Fig. 11 is a sectional view of one of the saw-shafts, showing the saw-disks, spacing-rings, and adjusting-nuts. Fig. 12 is a detail plan view, on an enlarged scale, of mechanism for holding the shook while it is being operated on by the saws. Fig. 13 is a plan view of one of the plates of the mechanism shown in Fig. 12. Fig. 14 is a similar view of a rack-plate employed in connection with the mechanism shown in Fig. 12. Fig. 15 is a detail horizontal sectional view of one end of the mechanism shown in Fig. 12. Fig. 16 is a vertical sectional view of the same. Fig. 17 is a detail view, on an enlarged scale, of the device for guiding and supporting the wood upon its withdrawal from the saws. Fig. 18 is a perspective view of a box made on the machine illustrated in the above-mentioned figures. Fig. 19 is a side view of one end of one of the side pieces of the same. Fig. 20 is an end view of the side piece shown in Fig. 19. Fig. 21 is a perspective view of one end of the side piece shown in Fig. 19. Fig. 22 is an end view of one of the pieces of the box shown in Fig. 18. Fig. 23 is a side view of the end piece shown in Fig. 22.

Referring to the drawings by reference characters, 1 designates a frame of suitable form, which is supported by legs 2 2. The upper longitudinal edges of the frame are provided with tracks or guides 3 3, upon which are mounted supports 4 4, which are designed to be adjusted toward and from each other. The supports 4 4 are provided with brackets 5 5, and each bracket is formed with a screw-threaded opening, which openings receive a shaft 6, the two ends of which are oppositely threaded, as shown in Fig. 3, the said shaft 6 being journaled on the frame in brackets 6' 6' and provided with a hand-wheel 6'', by means of which the shaft is turned to cause the supports 4 4 to be moved toward or away from each other. The supports 4 4 are formed with elongated openings 7 7, which openings are adapted to receive adjustable bearing-blocks 8 8, said blocks being adjusted by means of screws 9 9, that are suitably journaled in the supports 4 4 and are provided with hand-wheels 9' 9' on their outer ends. An oblique shaft 10 is journaled in each of the bearing-blocks 8, and upon each of the oblique shafts 10 is mounted a plurality of saw-disks 11, the said disks being partially surrounded by shields 12 12, carried by the supports 4 4.

The supports 4 4 are provided with additional elongated openings 7' 7', which receive adjustable bearing-blocks 8' 8', in which are journaled vertical saw-shafts 10' 10', and the said bearing-blocks 8' 8' are adjusted by means of screws 9'', which are suitably journaled in the supports 4 4, and have on their outer ends hand-wheels 9''', by means of which they may be turned. Upon the shafts 10' 10' are mounted a plurality of saws 11', these saws being also partially surrounded by shields 12, above mentioned. From the foregoing it will be observed that means is provided for adjusting the two sets of saw-carrying shafts toward or from each other to accommodate shooks of varying size by means of a shaft 6. It is also apparent that each shaft may be independently adjusted by means of its adjusting-screw 9 or 9'' to throw the saws carried by said shaft into or out of operative position.

As before mentioned, the front shafts 10' 10' are in a vertical position, while the rear shafts 10 10 are in an oblique position, whereby the saws carried by the respective shafts operate upon the shook at different angles to provide mortises and tenons of the form hereinafter described. When the oblique pair of saw-shafts 10 10 are so adjusted as to be out of position for operation, the machine may be used simply to form the ordinary lock-corner boxes. In the same position the saws on the vertical saw-shafts 10' 10' may be used to make straight cuts in the beveled openings of box-sections for the purpose of receiving wedges, and when these straight cuts are being made the shook is held in such manner that each section of board will be in a vertical position. One of the vertical shafts 10' is shown in the detail sectional view, Fig. 11, and upon reference to this figure it will be seen that the saws 11' 11' thereon are spaced apart by rings or washers 11'' and that the saws and washers are maintained in position on the shaft by means of nuts 11''' on the ends of the shaft. The saws on the oblique shafts 10 10 are spaced apart and secured on the shaft in a similar manner; but the saws on these shafts are of gradually-increasing size from top to bottom of the shaft, as shown in Fig. 10, the inner cutting edge of the saws on the oblique shaft by this arrangement being all in vertical alinement, as shown.

Referring now to Fig. 9 of the drawings, wherein I have shown the mechanism for imparting motion to the shafts 10 10 10' 10', 51 designates a shaft, which is journaled in the frame 1, and receives motion from a suitable source of power, such motion being communicated to a pulley 50, which is fast on said shaft, by a belt. (Not shown.) The shaft 51 carries two small pulleys 51' 51', from which motion is communicated to the shafts 10 10 by belts 52 52, and the shaft 51 carries two other small pulleys 51'' 51'', from which motion is communicated to the shafts 10' 10' by belts 53 53.

In the course of time the saw-disks carried by the several shafts 10 10 10' 10' will wear down, and assuming that the wear upon the saw-disks is chiefly upon the upper sides thereof this wear can be compensated for by forcing the saw-disks slightly higher upon the saw-shafts by simply adjusting the nuts 11''' 11''' on the threaded portions of the saw-shafts, the saw-disks, it being understood, being loosely mounted on the shafts, so that they may be adjusted upwardly or downwardly by a corresponding movement of the nuts 11''' 11'''.

The devices for holding and manipulating the shook while it is being operated upon by the saws are mounted upon the sliding carriage 13, which carriage moves upon tracks or guides 14, secured to the frame. The carriage 13 is provided on its under side with a rack 15, with which engages a gear 16, carried by a shaft 17, that is journaled in the frame and is rotated by any suitable power-transmitting mechanism connected with the main driving-shaft of the machine.

A work-holder is mounted upon the carriage 13, and this work-holder comprises a stationary member 18 and a movable member 19. The movable member is mounted upon guides on the carriage and is adapted to be moved toward and from the stationary member by the means of a screw 20, which is journaled in the carriage and passes through a screw-threaded hole in a depending portion 19' of the sliding member 19. A pinion 21 is fixed upon the screw 20, and this pinion meshes with a gear-wheel 22, that is carried on the inner end of a shaft 22', journaled in the end frame of the carriage 13, said shaft 22' having at its outer end a hand-wheel 23 by means of which it can be rotated and motion thereby imparted to the shaft 20 to move the movable member 19 toward or from the stationary member 18.

The members 18 and 19 are of substantially the same form, and the member 18 has an oblique inner face 18', while the member 19 has an oblique inner face 19''. The member 18 is provided with two inwardly-projecting parallel arms 24 24 at one side of its upper edge and with two similar arms 24' 24' at the other side, while the member 19 is provided with two similar pairs of arms 25 25 25' 25'. The arms of the member 18 are connected to the alined arms of the member 19 by rabbet-joints, as shown, the overlapping ends of the arms being provided with a plurality of perforations adapted to receive pins 26, by means of which the arms of the respective members are secured together to prevent any accidental movement being imparted to said members. The members 18 19 are provided with duplicates of the above-mentioned parallel arms at their lower edges, and between the parallel arms at the lower edges of the members are pivoted levers 27 27', two such levers being pivoted between the parallel arms of each of the members 18 19, these levers extending between the parallel arms at the upper edges of the members and being adapted to be moved back and forth in the spaces between the upper parallel arms to vary the position of the shook or load 28, which is held between the levers 27 and the levers 27', as clearly shown in Figs. 4 and 5. The upper arms of both members are provided with apertures, and the levers 27 27' are also provided with apertures adapted to be brought into registration with the first-named apertures, and pins or bolts 29'''' are provided which pass through the apertures in the levers and the apertures in the parallel bars and hold the levers in their proper position and against accidental displacement. When it is desired to make a cut in one direction in the sections of wood of which the shook 28 is composed to form one side of the tenons, the levers 27 27' are rocked, carrying the load or shook with them into the position shown in full lines in Fig. 4, and when it is desired to make a cut in the shook at an opposite slant said levers, carrying the load or shook with them, are rocked into the position shown in dotted lines in Fig. 4, and in both positions the levers are held against accidental displacement by means of the pins or bolts 29'''', which are of course removed when it is desired to rock the levers as above described.

While the load or shook 28 is being cut by the saws it is held by means of a clamp C, which is carried by the members 18 19, and is arranged on either side thereof. This clamp is shown in detail and on an enlarged scale in Figs. 12 to 16 of the drawings, to which I will now particularly refer. The clamp is composed of a stationary bar 29, that is sustained in fixed position in sockets 28' 28'', and a movable toothed bar 31 that is also sustained in the sockets 28' 28'', the latter, it being understood, being carried one by the stationary member 18 and the other by the movable member 19. The toothed bar 31 is formed with beveled notches 34 34 in its rear edge, and the bar 29 carries beveled blocks 35 35, which fit into the notches 34 34, so that if the notched bar 31 is moved in the direction of its length it will at the same time be moved laterally by the beveled blocks 35 and the notches 34, the beveled sides of the notches sliding on the beveled sides of the blocks, and thereby imparting a lateral movement to the toothed bar 31. The toothed bar 31 has at one end a slot 30, in which the upper edge of the head 30' of a screw-threaded bolt 31' rests, the said bolt passing through a screw-threaded hole in the socket 28'' and being provided with a hand-wheel 32, by means of which it is turned. The bar 29 is fixed in both sockets 28' 28'', and the bar 31 slides in both of said sockets.

From the above description it will be apparent that when the shook is in position and while the saws are operating upon the same it can be firmly clamped by turning the bolt 31' so as to draw the toothed bar 31 in the direction of the arrow, Fig. 12, this movement causing the toothed plate to be moved laterally at the same time, so that the teeth on the edge of the same will engage with the edges of the several sections of wood of which the shook is composed, and it will also be understood that a movement in the reverse direction will disengage the teeth of the bar 31 from the shook, the plate 29 being provided with pins 29', which project through oblique slots 31'' in bar 31.

In order to guide and support the wood upon its withdrawal from the saws, I have provided blades 40 40, one of which is arranged at the outer edge of each of the shields 12. These blades are pivoted to the shield at 43 and are provided with depending weights 41 41, as shown in Fig. 17 of the drawings, each of these blades as the shook leaves the saws entering one of the cuts at each end of the shook and serving to guide and support the wood upon its withdrawal from the saws at any time when the boss 31 may be disengaged from the shook. The blades 40, it is to be understood, entering one of the slots in the side of the shook, serve to maintain the boards at the proper inclination after they have been rocked and until they are clamped by the toothed bars 31, it being necessary in order to rock the shook to first release the bars 31 from engagement therewith, and the blades 40 40 therefore serving to hold the boards of which the shook is composed during such time as they are not held by the bars 31.

The machine being constructed as above described is operated in the following manner: The several sections of wood which constitute the load or shook are placed in position between the members 18 19 at the same inclination as the inclined side of the member 18, the shook in this position being held between the levers 27 27' and the levers being held against accidental displacement by means of the pins 29'''' 29''''. The toothed blade 31 of the clamping device is then caused to engage the end of the shook by turning the hand-wheel 32 and thereby forcing the toothed plate 31 into contact with the shook. The carriage 13 is now propelled forwardly by imparting movement to the shaft 17, and as the shook passes between the saws carried by the oblique shafts 10' 10' the sections of wood in the shook will be given the upper beveled cut 46 on the side piece 45 of Fig. 19 by the oblique saws on the left-hand side of the machine, while a cut at an opposite slant will be given to the other end of the shook by the obliquely-arranged saws at the right-hand side of the machine. Both of these cuts have a slant inwardly and downwardly toward the center of the piece and a slant upwardly and forwardly, as indicated at 46, Fig. 19. When the shook has received the cuts just described, the carriage is then caused to return to its original position by reversing the direction of movement of the shaft 17, and the pins 29'''' 29'''' being removed the levers 27 27' are rocked, so as to incline them in the direction shown in dotted lines in Fig. 4. The clamp-plate 31 is of course released from engagement with the shook while it is being rocked and caused to again engage the same after the shook has assumed its new position. After the shook has been rocked in the manner described to the position indicated by the dotted lines in Fig. 4 the carriage is again moved forwardly, as before, and the shook again passed between the obliquely-arranged saws. These saws, by reason of the opposite inclination given to the load or shook, will make cuts like those numbered 47 in Fig. 19, which cuts are in some respects the opposite of the cuts 46 or, in other words, slanting inwardly and upwardly, but have a bevel extending forwardly and upwardly on the under side of each tenon just like the bevel 46 upon the upper side of each tenon, but, as before stated, slanting upwardly and forwardly and giving a forward taper to each tenon. This lower bevel is seen at 47 in Fig. 19.

In so much of the above operation as has been described the vertically-arranged saw-shafts are not used, the same being thrown out of operative position in the manner hereinbefore pointed out by means of the screws 9'' 9''.

It will be noted that the opposite inclination of the bevel on the tenon of the side piece is formed, as above described, by rocking the load or shook from the position illustrated by the full lines in Fig. 4 to that indicated by the dotted lines in the same figure. The tenons on the end piece, however, have their slant or inclinations in a different direction and cannot be formed by merely rocking the boards out of which the end pieces are formed in the manner above described for treatment of the said side pieces. In order to give the tenons of the end pieces the shape necessary to enable them to lock with the slanting beveled mortises and tenons of the side pieces, it is necessary to make use of both pairs of saws provided in this machine. Thus the front shafts being vertical and having horizontal saw-disks will make a straight cut on the ends of the end pieces when end pieces are being cut in the machine, while the oblique saw-disks remaining in the same position which they occupy while making the cuts hereinbefore described in the side pieces will of course make a cut slanting downwardly in the end pieces when the end pieces are being cut in the machine. In cutting end pieces the load or shook out of which the end pieces are to be formed is caused to travel past the saws, with the levers of the work-holder holding the load in the position indicated by dotted lines in Fig. 4. The appearance of the tenons of the end pieces after the same have been cut by passing them through both pairs of saws (it being understood that in cutting the tenons of the end pieces both the oblique and horizontal saws are in action) is indicated in Figs. 18, 22, and 23.

From the foregoing it will be apparent why I mount the several saw-shafts so as to be independently adjustable—that is, so as to permit them to be brought separately into or out of operative position—the object being to enable the operator to set them in position to permit the saws to act conjointly or singly upon the load or shook.

It will be understood that, if desired, for any particular work apart from making the box illustrated in the drawings to have the shook stand in a vertical instead of in an inclined position this can be accomplished by so adjusting the levers 27 and 27'.

It is old in the art to arrange the guides 14 so that they can be raised or lowered slightly at will.

Having fully described my invention, what I claim as new, and desire to secure by Letters Patent, is—

1. In a machine for woodworking, the combination of a frame, saws adjustably mounted thereon, a work-holder mounted upon said frame, a clamp carried by said work-holder comprising sockets mounted on the work-holder, a bar rigidly secured in said sockets and provided with beveled lugs, and a clamping-bar having teeth on one edge and notches on the opposite edge, said notches receiving said beveled lugs, and means for moving said clamping-bar longitudinally so as to cause the beveled lugs and the notches to move the clamp-bar laterally, simultaneously with its longitudinal movement.

2. In a woodworking-machine, obliquely-arranged saws, a shield for said saws, a weighted bell-crank lever pivotally mounted on said shield, a guide-blade carried by said lever, a work-holder mounted in said machine, means for rocking and reciprocating said work-holder, a clamping-bar mounted on said work-holder, means for moving said clamping-bar longitudinally, and means for moving said clamping-bar laterally, substantially as described.

3. In a machine of the character described, the combination of the rocking work-holder, a pair of saws in fixed relation to said work-holder, adjusting means for said saws and means to prevent vertical displacement of the work, comprising two bars having coöperating lugs and notches thereon, one of said bars being fixed in position, and the other having a toothed edge and being movable on the fixed bar, and means for releasing the toothed bar from engagement with the work, substantially as described.

4. In a woodworking-machine, the combination of a frame, a work-holder, pivoted adjustable arms arranged on said work-holder, sockets carried by the work-holder, a stationary bar fixed in said sockets, lugs carried by said stationary bar, a toothed bar mounted on said stationary bar, said toothed bar having notches in its rear edge engaging said lugs and means for moving said toothed bar lengthwise on the said stationary bar, substantially as described.

5. In a machine of the character described, the combination of a work-holder, having sockets, a pair of bars fitting into said sockets, lugs on one of said bars, coöperating notches on the other, one of said bars being provided with teeth on one edge, and a thumb-screw connected to said last-named bar and adapted to adjust the same, substantially as described.

6. In a machine of the character described, a work-holder provided with horizontal arms having slots therein, pivoted arms secured in said slots, said work-holder having sockets formed therein, two bars secured in said sockets, beveled notches in one bar, lugs on the other bar adapted to slide in said beveled notches, one of the said bars having teeth on one edge, and means for moving said toothed bar into and out of engagement with the work in said work-holder, substantially as described.

7. In a machine for woodworking, the combination with a frame therein, of independently-adjustable oblique and vertical saws, means for adjusting said saws, shields for the saws, a pivoted guide-blade secured to said shields, a work-holder rockingly and reciprocatingly mounted on the frame, means for rocking the same, means for reciprocating the work-holder, means for preventing the vertical displacement of the work held therein, comprising a bar having an adjustable toothed bar mounted thereon and means for moving said toothed bar into and out of engagement with the work, substantially as described.

8. In a woodworking-machine, the combination with the frame, of saws arranged thereon, a work-holder adapted to be moved between the saws to present its load or shook to the saws, a clamp comprising a bar provided with lugs, a clamping-bar slidably arranged upon the first-named bar and adapted to be brought into engagement with the load or shook by means of the lugs, and means for sliding the clamping-bar.

9. In a machine of the type set forth, a work-holder consisting of two members arranged in spaced relation, a pair of spaced inwardly-projecting arms carried by each of said members at each end of the top and bottom thereof, means for adjustably securing adjacent pairs of arms to each other, and levers having their lower ends pivotally held between the lower pairs of arms and their upper ends adjustably retained between the upper pairs of arms.

10. In a machine of the type set forth, a work-holder embodying two members, spaced arms carried by each of said members and projecting inwardly to have adjacent arms engage and be secured to one another, and levers pivoted to the lower of the arms and adjustably secured to the upper of the arms.

11. In a machine of the type set forth, the combination with the work-holder and means for mortising the work, means for guiding and supporting the work upon its withdrawal from said cutting means which embodies a pivoted weighted element having its free end movable in a vertical rotary plane to engage in said mortises.

12. A work-holder consisting of a pair of members adjustable toward and away from one another, means carried by each of the members at the upper and lower portions thereof for overlapping engagement with one another to enable said members to be rigidly secured in adjusted position, and rocking means between the members supported from the lower of said means and adjustably secured to the upper of said means to retain the work.

13. A work-holder consisting of a pair of spaced adjustable members having overlapping and connected parts extending in said space to support the work thereon, and means borne by each of said members and spanning the space therebetween to engage the work, said means extending in and maintaining its relation to said space in any adjusted position of said members.

14. A work-holder consisting of a pair of spaced members having means to support the work thereon, the ends of said work extending beyond said members, and means secured to each of said members and spanning the space therebetween to bite horizontally and simultaneously into each of the projecting ends of the individual pieces of the work.

15. A work-holder consisting of a pair of spaced adjustable members having means to support the work extending in said space, and a device supported adjacent its ends from each of said members and spanning the space therebetween, said device embodying a toothed element, and means to impel said element inwardly to engage the work.

16. A work-holder consisting of spaced and adjustable members to support the work in vertical position, pivoted elements carried by said members and disposed in said space to receive the work and rock the same to different positions, the work having its ends extending beyond said members, and means carried by said members and spanning the space between said members to engage the work in any position to which the same may be rocked.

17. A work-holder consisting of a pair of spaced coöperating adjustable members, adjustable rocking elements carried by said members in said space, to receive the work therebetween, means to secure said elements in adjusted position, and means carried by the members to horizontally engage the work between said elements at any position to which the same may be rocked.

18. A work-holder consisting of a pair of spaced members adjustable toward and away from one another to support the work in vertical position therebetween, rockable means carried by said members in said space to clamp and rock the work, and means carried by said members and spanning the space between the members, to horizontally engage the work.

19. In combination with a work-holder embodying spaced members to clamp the work and carrying means to rock the same to different positions, a toothed device secured by its ends to each of said members and spanning the space between said members, and means to impart a synchronous lateral and longitudinal movement to said toothed device to cause the teeth thereof to bite into the individual pieces of the work.

20. A work-holder consisting of a pair of spaced members each having inwardly-extending overlapping parts to adjustably engage one another, and rocking elements to receive the work therebetween pivoted by their lower and adjustably secured by their upper ends to said parts.

21. A work-holder consisting of a pair of spaced members having connecting parts, rocking elements pivotally secured at one end and adjustably secured at their opposite end to said parts, and means to engage the work between said elements in any position of the latter secured to each of said members and spanning the space therebetween.

In testimony whereof I have affixed my signature in presence of two witnesses.

BERTHOLD A. LANGE.

Witnesses:
HUGH K. WAGNER,
GLADYS WALTON.